US012010325B2

(12) United States Patent
Garg et al.

(10) Patent No.: US 12,010,325 B2
(45) **Date of Patent: *Jun. 11, 2024**

(54) INTRA BLOCK COPY SCRATCH FRAME BUFFER

(71) Applicant: QUALCOMM Incorporated, San Diego, CA (US)

(72) Inventors: Kapil Garg, Fremont, CA (US); Gaurav Avinash Patil, San Jose, CA (US); Yasutomo Matsuba, San Diego, CA (US); Vladan Andrijanic, San Diego, CA (US); Prasanth Gomatam, San Diego, CA (US); Rajesh Chowdary Chitturi, San Jose, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/048,120

(22) Filed: Oct. 20, 2022

(65) Prior Publication Data

US 2023/0059060 A1 Feb. 23, 2023

Related U.S. Application Data

(63) Continuation of application No. 17/173,961, filed on Feb. 11, 2021, now Pat. No. 11,516,477.

(51) Int. Cl.
*H04N 11/02* (2006.01)
*H04N 19/132* (2014.01)
(Continued)

(52) U.S. Cl.
CPC ......... *H04N 19/146* (2014.11); *H04N 19/132* (2014.11); *H04N 19/159* (2014.11); *H04N 19/176* (2014.11)

(58) Field of Classification Search
CPC .. H04N 19/146; H04N 19/132; H04N 19/159; H04N 19/176
(Continued)

(56) References Cited

U.S. PATENT DOCUMENTS 11,516,477 B2 * 11/2022 Garg .................... H04N 19/176
2007/0230572 A1 10/2007 Koto et al.
(Continued)

FOREIGN PATENT DOCUMENTS

WO 2017039883 A1 3/2017

OTHER PUBLICATIONS

International Search Report and Written Opinion—PCT/US2022/012133—ISA/EPO—dated Apr. 19, 2022.
(Continued)

*Primary Examiner* — Jayanti K Patel
*Assistant Examiner* — Richard B Carter
(74) *Attorney, Agent, or Firm* — Shumaker & Sieffert, P.A.

(57) ABSTRACT

An example apparatus includes a first frame buffer configured to store video data; a second frame buffer configured to store video data; and one or more processors configured to: reconstruct samples of a first block of a current picture of video data; store, in parallel, a compressed version of the samples of the first block of video data in the first frame buffer and an uncompressed version of the samples of the first block of video data in the second frame buffer; and responsive to determining to reconstruct a second block of the current picture of video data using intra block copy: obtain, from the second frame buffer, samples of a predictor block located in the current picture of video data, the predictor block at least partially overlapping the first block of video data; and predict, based on the obtained samples of the predictor block, samples of the second block.

22 Claims, 9 Drawing Sheets

VIDEO ENCODER 200
VIDEO DATA MEMORY 230
VIDEO DATA
MODE SELECTION UNIT 202
INTER PREDICITON UNIT 222
(TRANSLATIONAL, AFFINE, OBMC, COMPOUND INTER-INTRA)
INTRA PREDICITON UNIT 226
(DIRECTIONAL, NON-DIRECTIONAL, RECURSIVE FILTER, CFL, IBC, PALETTE)
204
TRANSFORM PROCESSING UNIT 206
QUANTIZATION UNIT 208
SYNTAX ELEMENTS
214
INVERSE TRANSFORM PROCESSING UNIT 212
INVERSE QUANTIZATION UNIT 210
ENTROPY ENCODING UNIT 220
LOOP FILTER UNIT 216 (DEBLOCKING, CDEF, LOOP RESTORATION)
DECODED PICTURE BUFFER 218
BITSTREAM

(51) Int. Cl.
*H04N 19/146* (2014.01)
*H04N 19/159* (2014.01)
*H04N 19/176* (2014.01)

(58) Field of Classification Search
USPC .................................................... 375/240.02
See application file for complete search history.

(56) References Cited

U.S. PATENT DOCUMENTS

| | | | | |
|---|---|---|---|---|
| 2008/0056348 | A1 | 3/2008 | Lyashevsky et al. | |
| 2008/0267295 | A1 | 10/2008 | Sung | |
| 2013/0034163 | A1 | 2/2013 | Amonou et al. | |
| 2014/0037272 | A1 | 2/2014 | Ziesler | |
| 2016/0219298 | A1 | 7/2016 | Li et al. | |
| 2016/0277733 | A1* | 9/2016 | Li | H04N 19/96 |
| 2016/0277766 | A1 | 9/2016 | Xu et al. | |
| 2016/0330471 | A1* | 11/2016 | Zhu | H04N 19/91 |
| 2016/0360234 | A1* | 12/2016 | Tourapis | H04N 19/593 |
| 2017/0302966 | A1* | 10/2017 | Xu | H04N 19/159 |
| 2018/0146205 | A1 | 5/2018 | Hellman | |

OTHER PUBLICATIONS

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Pang C., et al., "AhG5: Intra Block Copying With Padding", 15. JCT-VC Meeting, Oct. 23, 2013-Jan. 11, 2013, Geneva, (Joint Collaborative Team on Video Coding of ISO/IECJTC1/SC29/WG11 and ITU-T SG.16), URL: http://wftp3.itu.int/av-arch/jctvc-site/no. JCTVC-00157-v5, Oct. 26, 2013 (Oct. 26, 2013), XP030115179, pp. 1-6.

Prosecution History for U.S. Appl. No. 17/173,961 dated from Mar. 21, 2022 through Jul. 29, 2022, 35 pages.

Xu X., et al., "DPB Considerations When Current Picture is a Reference Picture", 22. JCT-VC Meeting, Oct. 15, 2015-Oct. 21, 2015, Geneva, (Joint Collaborative Team on Video Coding of ISO/IECJTC1/SC29/WG11 and ITU-T SG.16), URL:http://wftp3.itu.int/av-arch/jctvc-site/, No. JCTVC-V0057, Oct. 6, 2015 (Oct. 6, 2015), XP030117707, 4 Pages.

* cited by examiner

INTRA BLOCK COPY SCRATCH FRAME BUFFER

This application is a continuation of U.S. patent application Ser. No. 17/173,961, filed 11 Feb. 2021, the entire contents of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra picture) prediction and/or temporal (inter picture) prediction to reduce or remove redundancy inherent in video sequences. For block-based video coding, a video slice or a video tile (e.g., a video picture or a portion of a video picture) may be partitioned into video blocks, which may also be referred to as coding blocks, superblocks, coding tree units (CTUs), coding units (CUs) and/or coding nodes. Video blocks in an intra coded (I) slice of a picture are encoded using spatial prediction with respect to reference samples (also called prediction samples) in neighboring blocks in the same picture. Video blocks in an inter coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for performing intra block copy using a scratch frame buffer. When coding video data, a reconstruction unit of a video coder (e.g., video decoder or a video encoder as part of a reconstruction loop) may store reconstructed samples of video data in frame buffers. The reconstructed samples may pass through one or more caches between the reconstruction unit and the frame buffers. In some examples, the video coder may compress the samples of video data and write the compressed samples in the frame buffers (e.g., to reduce storage bandwidth). A frame buffer that stores compressed samples may be referred to as a compressed frame buffer.

To predict a current block in a current picture using intra block copy, an intra block copy unit of a video coder may identify a reference block located in a reconstructed area of the current block (e.g., using a vector which may be referred to as a block vector or motion vector) and reconstruct samples of the current block based on samples of the reference block. The intra block copy unit may obtain the samples of the reference block from the frame buffers. Where the samples of the reference block are compressed, the video coder may include a decompression unit between the frame buffers and the intra block copy unit.

Samples reconstructed by the reconstruction unit may not be immediately available in the frame buffers. For instance, a reconstructed sample may pass through a cache and/or a compression unit before it is available to be read from the frame buffers. In some examples, the video coder may implement sample tracing to enable a reconstructed sample to be read, and thereby used by the intra block copy unit, prior to the reconstructed sample being written to the frame buffer. However, performing such sample tracing may result in overhead (e.g., additional processor cycles and/or memory requirements), particularly where compression is used. Additionally, as compression is performed on blocks (as opposed to individual samples), architectures in which the intra block copy unit obtain samples from a compressed frame buffer may result in more samples than required being accessed from the compressed frame buffer, which may undesirably increase storage bandwidth.

In accordance with one or more techniques of this disclosure, a video coder may utilize a scratch frame buffer when performing intra block copy. For instance, the reconstruction unit may store samples of a reconstructed block of a current frame to both a scratch frame buffer and store a compressed version of the samples to a compressed frame buffer. The intra block copy unit may obtain samples from the scratch frame buffer to predict another block of the current frame using intra block copy. The video coder may utilize samples from the compressed frame buffer for other purposes, such as subsequent inter prediction or output to a display. In this way, the intra block copy unit may be able to perform intra block copy while avoiding the complexity of pixel tracing through compression.

In one example, a method includes reconstructing samples of a first block of a current picture of video data; storing, in parallel, a compressed version of the samples of the first block of video data in a first frame buffer and an uncompressed version of the samples of the first block of video data in a second frame buffer; and responsive to determining to reconstruct a second block of the current picture of video data using intra block copy: obtaining, from the second frame buffer, samples of a predictor block located in the current picture of video data, the predictor block at least partially overlapping the first block of video data; and predicting, based on the obtained samples of the predictor block, samples of the second block.

In another example, a device includes a first frame buffer configured to store video data; a second frame buffer configured to store video data; and one or more processors implemented in circuitry, the one or more processors configured to: reconstruct samples of a first block of a current picture of video data; store, in parallel, a compressed version of the samples of the first block of video data in the first frame buffer and an uncompressed version of the samples of the first block of video data in the second frame buffer; and responsive to determining to reconstruct a second block of the current picture of video data using intra block copy: obtain, from the second frame buffer, samples of a predictor block located in the current picture of video data, the predictor block at least partially overlapping the first block of video data; and predict, based on the obtained samples of the predictor block, samples of the second block.

In another example, a device includes means for reconstructing samples of a first block of a current picture of video data; means for storing, in parallel, a compressed version of the samples of the first block of video data in a first frame buffer and an uncompressed version of the samples of the first block of video data in a second frame buffer; and means for, responsive to determining to reconstruct a second block of the current picture of video data using intra block copy: obtaining, from the second frame buffer, samples of a predictor block located in the current picture of video data, the predictor block at least partially overlapping the first block of video data; and predicting, based on the obtained samples of the predictor block, samples of the second block.

In another example, a computer-readable storage medium is encoded with instructions that, when executed, cause a programmable processor to reconstruct samples of a first block of a current picture of video data; store, in parallel, a compressed version of the samples of the first block of video data in a first frame buffer and an uncompressed version of the samples of the first block of video data in a second frame buffer; and responsive to determining to reconstruct a second block of the current picture of video data using intra block copy: obtain, from the second frame buffer, samples of a predictor block located in the current picture of video data, the predictor block at least partially overlapping the first block of video data; and predict, based on the obtained samples of the predictor block, samples of the second block.

The details of one or more examples are set forth in the accompanying drawings and the description below. Other features, objects, and advantages will be apparent from the description, drawings, and claims.

DETAILED DESCRIPTION

Figure 1:
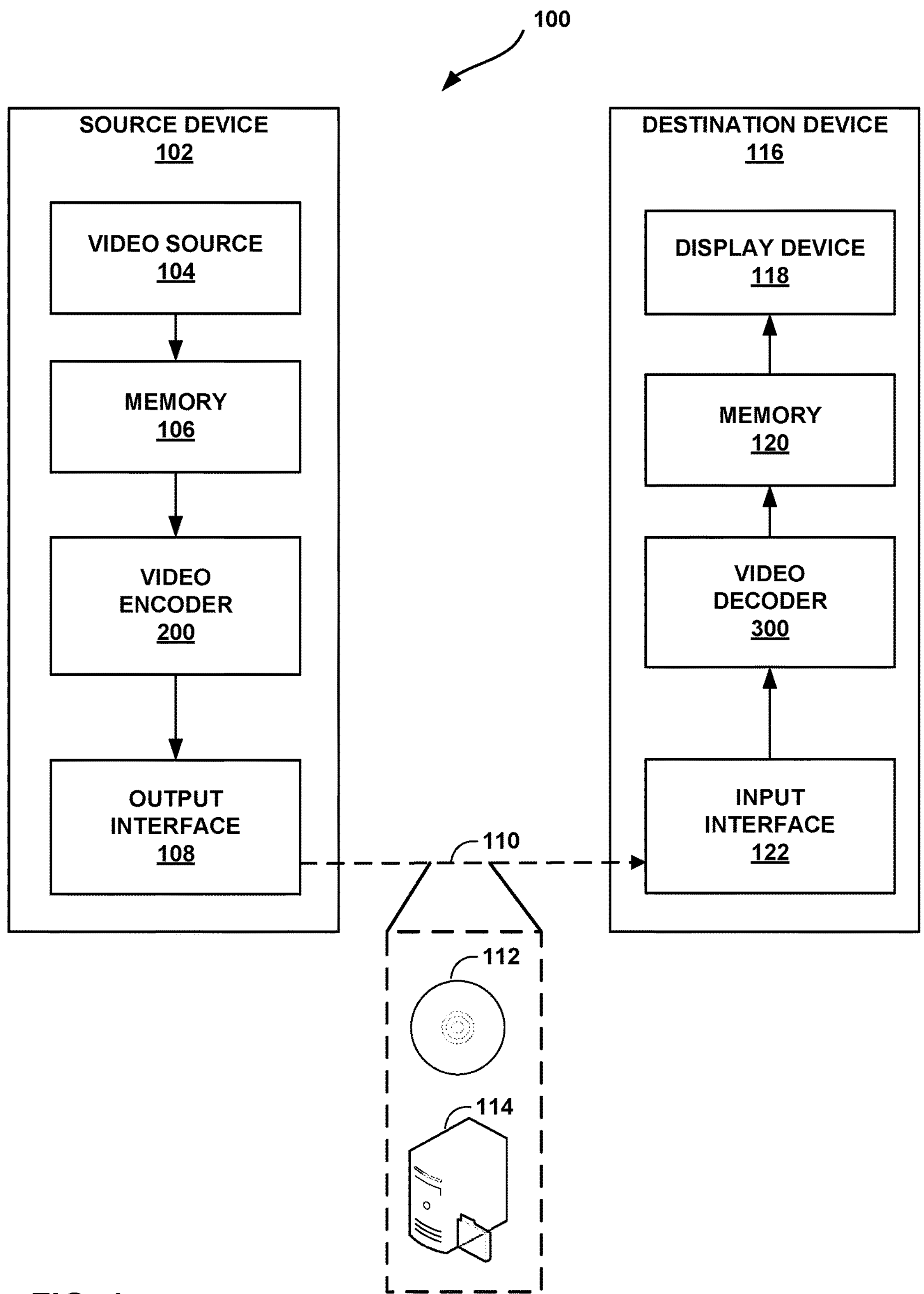
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for performing intra block copy with a scratch frame buffer. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for performing intra block copy with a scratch frame buffer. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

In some examples of the disclosure, video encoder 200 and video decoder 300 may operate according to a video coding format, such as AOMedia Video 1 (AV1) or extensions thereto, as well as successor coding formats (e.g., AV2) that may currently be in development or will be forthcoming. In other examples, video encoder 200 and video decoder 300 may operate according to other proprietary or industry standards. The techniques of this disclosure, however, are not limited to any particular coding standard and/or video coding format. In general, video encoder 200 and video decoder 300 may be configured to perform the techniques of this disclosure in conjunction with any video coding techniques that use scratch frame buffers for intra block copy.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

This disclosure may use "N×N" and "N by N" interchangeably to refer to the sample dimensions of a block (such as a coding block, superblock, or other block of video data) in terms of vertical and horizontal dimensions, e.g., 16×16 samples or 16 by 16 samples. In general, a 16×16 coding block will have 16 samples in a vertical direction (y=16) and 16 samples in a horizontal direction (x=16). Likewise, an N×N coding block generally has N samples in a vertical direction and N samples in a horizontal direction, where N represents a nonnegative integer value. The samples in a coding block may be arranged in rows and columns. Moreover, coding blocks need not necessarily have the same number of samples in the horizontal direction as in the vertical direction (i.e., the coding block may be non-square). For example, coding blocks may comprise N×M samples, where M is not necessarily equal to N.

When operating according to the AV1 codec, video encoder 200 and video decoder 300 may be configure to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of the block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding enables parallel processing and multi-threading for encoder and decoder implementations.

In some examples, a coding block includes a coding bock of luma samples and two coding blocks of corresponding chroma samples for a picture that has three sample arrays. In other examples, a coding block comprises a single coding block of luma samples (e.g., for a monochrome picture). AV1 supports 4:0:0 chroma subsampling (e.g., monochrome), 4:2:0 chroma subsampling, 4:2:2 chroma subsampling, and 4:4:4 chroma subsampling (i.e., no chroma subsampling). AV1 may code video data in a YUV color space where Y is a luma component, U is a first chroma component (e.g., blue projection), and V is a second chroma component (e.g., red projection).

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

The difference between the currently encoded samples and predicted values generated from the reference samples is called a residual. Video encoder 200 may encode the residual values (e.g., through transformation, quantization, and entropy coding) in an encoded video bitstream. Video decoder 300 may decode the residual values, determine predicted values generated from the reference samples in the same manner as video encoder 200, and add the predicted values generated from reference samples to the residuals to reconstruct the coding block The intra prediction modes of AV1 include directional intra prediction, non-directional smooth intra prediction, recursive filter intra prediction, chroma from luma (CFL) prediction, intra block copy, and color palette modes. Video encoder 200 may encode syntax elements that indicate the intra prediction mode used to video decoder 300.

Video encoder 200 may generally form a prediction block for the coding block using one of the aforementioned inter prediction modes or intra prediction modes (e.g., excluding color palette mode). In general, video encoder 200 subtracts the value of the sample of the coding block from a prediction sample determined according to one of the intra prediction modes or inter prediction modes to determine a residual block. Video decoder 300 performs the inverse of this operation. Video decoder 300 determines the prediction samples in the same manner as video encoder 200, but adds the decoded residual to the prediction sample to reconstruct the coding block.

To encode a block using directional intra prediction, video encoder 200 may determine particular directional intra prediction mode to determine the prediction samples. AV1 provides fifty-six directional intra prediction modes. When encoding a coding block using directional intra prediction, video encoder 200 uses a directional predictor that projects each sample of the coding block to a prediction sample location. The prediction sample location may be a sub-pixel location (e.g., between samples). In such a case, video encoder may use interpolation (e.g., a 2-tap bilinear filter) to determine the value of the prediction sample.

In non-directional smooth intra prediction, video encoder 200 may determine prediction samples according a DC prediction mode, a Paeth prediction mode, or by using one of three smooth predictors. In DC prediction mode, video encoder 200 predicts samples of a block from the average of available neighboring reference samples. In Paeth prediction mode, video encoder 200 uses one of a top reference sample, left reference sample, or top-left edge reference sample which has a value closest to (top+left−topleft). Video encoder 200 may determine the three smooth predictors using quadratic interpolation in a horizontal direction, a vertical direction, or the average of the interpolations in the horizontal and vertical directions.

Video encoder 200 may determine to use recursive filter intra prediction in situations where there is reduced spatial correlation between samples of the coding blocks and prediction samples at the edges of coding blocks. To perform recursive intra prediction, video encoder 200 may determine one of five filter intra modes. Each of the five intra modes are defined by a set of 7-tap filters that specify a correlation between samples in a 4×2 sub-block and seven adjacent neighboring samples. Video encoder 200 may determine one of five types of intra filter modes at the block level and predict samples in 4×2 sub-blocks.

Video encoder 200 may determine to use chroma from luma (CFL) to predict chroma samples from corresponding reconstructed luma samples. In particular, video encoder 200 may use sums of reconstructed luma samples in 2×2 sub-blocks of a luma block minus the average luma sample value of the block, as well as DC prediction samples for the chroma block, to determine a final prediction sample for predicting the chroma samples. The sums of reconstructed luma samples in 2×2 sub-blocks of a luma block minus the average luma sample value of the block represent an "AC" contribution from the luma block.

Figure 5:
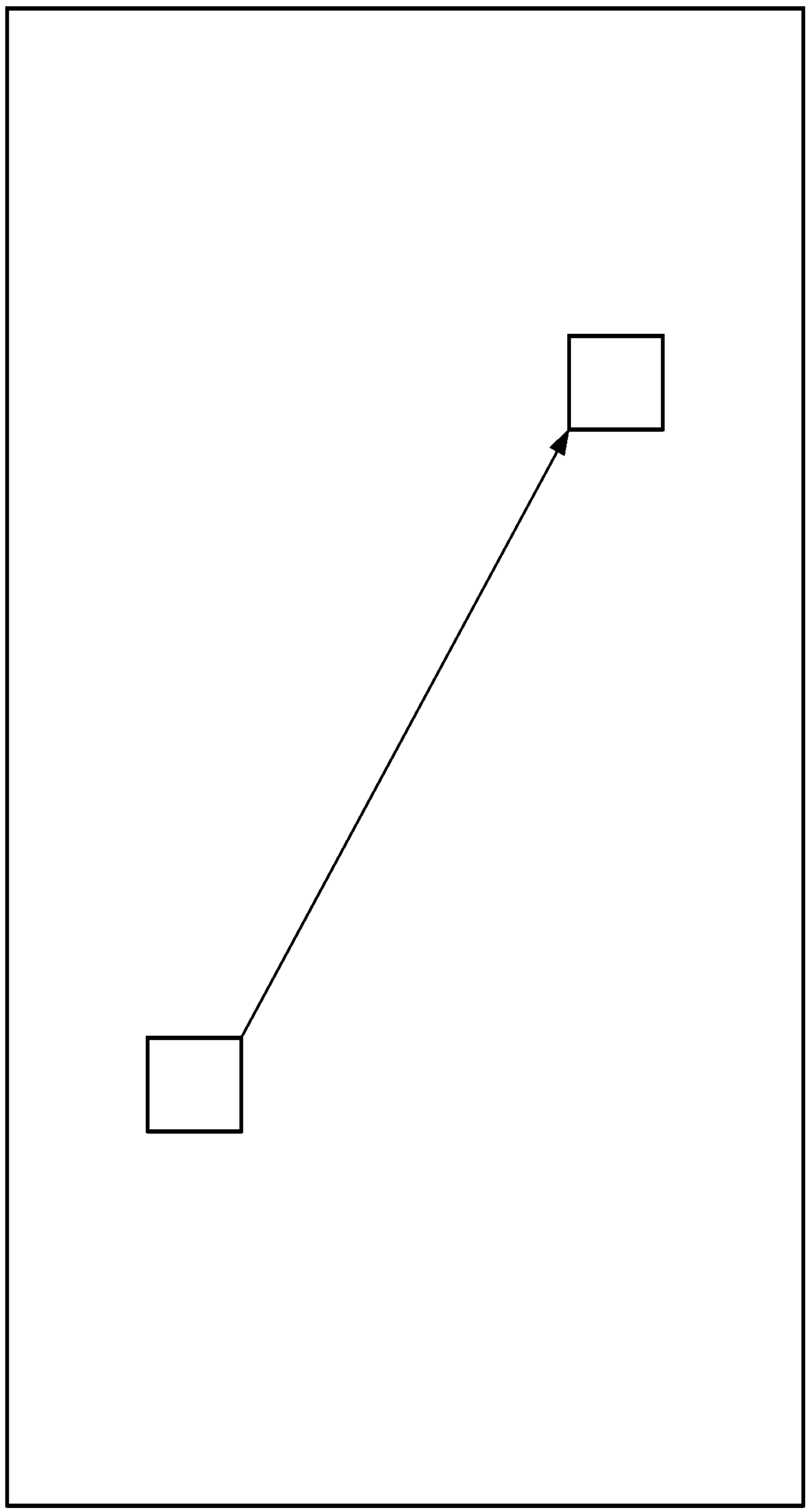
FIG. 5 is a conceptual diagram illustrating an example of intra block copy.

In intra block copy mode, video encoder 200 and video decoder 300 may predict a coding block using a previously-reconstructed coding block as a reference block, where the reference block is in the same frame as the currently coded coding block. Video encoder 200 may indicate a location of the previously-reconstructed coding block using a displacement vector (e.g., an x and y displacement from the currently coded coding block). Intra block copy mode is similar to a translational inter prediction mode, but rather than using a reference block in another frame, the intra block copy mode uses a reference block from the same frame. Intra block copy mode may be particularly useful for so-called "screen content" video frames that may include text, characters, and/or repeated textures (e.g., such as video displaying the contents of a computer screen). FIG. 5 is a conceptual diagram illustrating an example of intra block copy.

In each of the aforementioned intra prediction modes, video encoder 200 may generate a residual block by subtracting the sample values of a currently coded block from prediction pixels generated in accordance with one of the intra prediction modes. Color palette mode is considered another type of intra prediction mode, as color palette mode does not use predicted samples generated from reference samples values. However, video encoder 200 and video decoder 300 do not encode and decode, respectively, residual values in color palette mode. Instead, video encoder 200 may associate code information that indicates an index to a color palette for each sample/pixel of the coding block. The color palette is a table of color values. Color palette mode may be useful for frames of video data with an limited number of unique colors (e.g., screen content).

Figure 4:
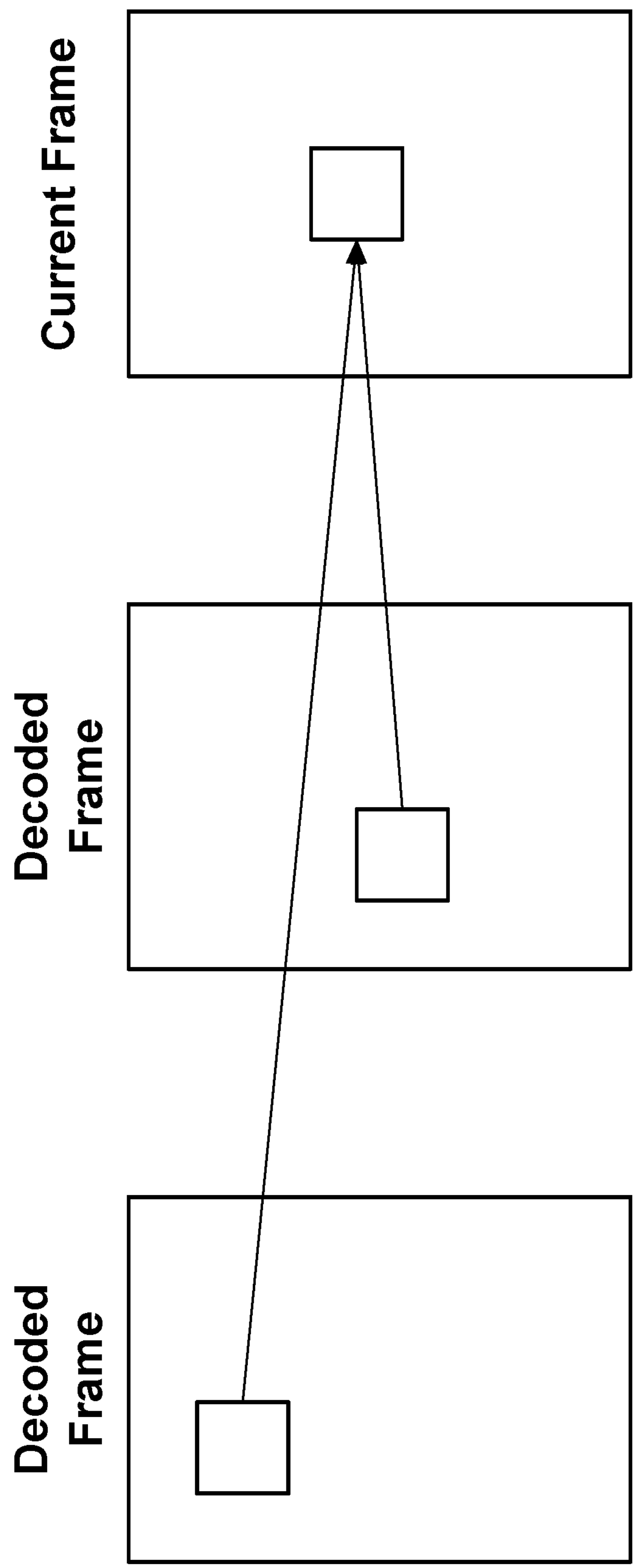
FIG. 4 is a conceptual diagram illustrating inter prediction.

When predicting blocks of a current frame of video data using an inter prediction mode, video encoder 200 and video decoder 300 may use video data from one or more reference frames of video data. Video encoder 200 may encode sample values based on the differences (e.g., the residuals) between sample values of a current block to be coded and prediction samples within a different frame (e.g., a reference frame). The reference frame may be before or after the currently coded frame in presentation order. Video encoder 200 may determine the prediction samples and reference frame based on the inter prediction mode. FIG. 4 is a conceptual diagram illustrating inter prediction. As shown in FIG. 4, a video coder (e.g., video encoder 200 and/or video decoder 300) may predict a block in the current frame from samples values in two decoded frames.

Like for intra prediction modes (excepting color palette mode), video encoder 200 may encode the residual values (e.g., through transformation, quantization, and entropy coding) in an encoded video bitstream. Video decoder 300 may decode the residual values, determine the prediction block in the same manner as video encoder 200, and add the prediction block to the residuals to reconstruct the coding block. Video encoder 200 may determine a particular inter prediction mode from among a plurality of inter prediction modes that provides the best rate-distortion cost. Video encoder 200 may encode the mode information, residual values (e.g., the difference between a current sample and a prediction sample), and other block characteristics in an encoded video bitstream. The inter prediction modes of AV1 include translational motion compensation, affine motion compensation (e.g., warped motion compensation), overlapped block motion compensation (OBMC), and compound inter-intra predictor modes.

For translational motion compensation, video encoder 200 may generate the prediction block (e.g., the block including the prediction samples) using one or more motion vectors. Video encoder 200 may generally perform a motion search to identify a reference block that closely matches the coding block, e.g., in terms of differences between the samples of the coding block and the prediction samples of the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current coding block using uni-directional prediction or bi-directional prediction.

Video encoder 200 may also encode the motion vector(s) using a prediction method. For example, video encoder 200 may encode motion vectors with reference to other candidate motion vectors, including spatial motion vectors (e.g., motion vectors of neighboring blocks encoded using inter prediction) or temporal motion vectors (e.g., motion vectors from co-located blocks in other pictures coded using inter prediction). The candidate motion vectors may be added to a dynamic motion vector reference list.

AV1 also provide an affine motion compensation mode. In affine motion compensation mode, video encoder 200 may determine the warping parameters to warp the reference block to get the prediction using neighboring candidates' motion vectors. The warping parameters represent non-translational or affine motion, such as zoom in or out, rotation, perspective motion, or other irregular motion types.

Video encoder 200 may use OBMC mode to decrease prediction errors near block edges. In OBMC mode, video encoder 200 and video decoder 300 determines prediction samples using prediction samples generated based on motion vectors from the top neighboring block and/or the left neighboring block. Video encoder 200 and video decoder 300 may generate the final prediction samples by combining such prediction samples using smoothing filters.

In compound inter-intra predictor mode, video encoder 200 and video decoder 300 may form a prediction sample using both inter prediction and intra prediction techniques. Two prediction samples may be combined using weighting coefficients.

When performing a prediction process, such as intra prediction or inter prediction of a block, video encoder 200 may calculate residual data for the block. The residual data, such as a residual block, represents sample by sample differences between the block and prediction samples for the block, formed using the corresponding prediction mode. Video encoder 200 may apply one or more transforms to the residual block, to produce transformed data in a transform domain instead of the sample domain. For example, video encoder 200 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may entropy encode syntax elements, including syntax element indicating the value of quantized transform coefficients. As another example, video encoder 200 may entropy encode prediction syntax elements (e.g., motion information for inter prediction or intra mode information for intra prediction). In accordance with AV1, video encoder 200 may be configured to perform entropy encoding using a symbol-to-symbol adaptive multi-symbol arithmetic coder. A syntax element in AV1 includes an alphabet of N elements, and a context (e.g., probability model) includes a set of N probabilities. Video encoder 200 may store the probabilities as 15 bit cumulative distribution functions (CDFs). Video encoder 200 may perform recursive scaling, with an update factor based on the alphabet size, to update the contexts.

In this manner, video encoder 200 may generate a bitstream including encoded video data, e.g., syntax elements describing partitioning of a picture into blocks (e.g., superblocks and coding blocks) and prediction modes and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using entropy decoding in a manner substantially similar to, albeit reciprocal to, the entropy encoding process of video encoder 200. The syntax elements may define partitioning information for partitioning of a picture into superblocks and coding blocks. The syntax elements may further define prediction and residual information for blocks (e.g., coding blocks) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (e.g., an intra or inter prediction mode) and related prediction information (e.g., motion information for inter prediction) to form a prediction samples for the block. Video decoder 300 may then combine the prediction samples and the corresponding sample values of the residual block (on a sample-by-sample basis) to reproduce the original block. Video decoder 300 may perform additional processing, such as performing a loop filtering process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, a video coder (e.g., video decoder 300 and/or video encoder 200 as part of the reconstruction loop) may utilize a scratch frame buffer when performing intra block copy. The video coder may store reconstructed samples of blocks of the current picture in the scratch frame buffer and compressed versions of the reconstructed samples in a compressed frame buffer. As opposed to obtaining samples of a reference block in the current picture from the compressed frame buffer, the video coder may obtain the samples of the reference block from the scratch frame buffer. In this way, the video coder may be able to perform intra block copy while avoiding the complexity of sample tracing through compression.

Figure 2:
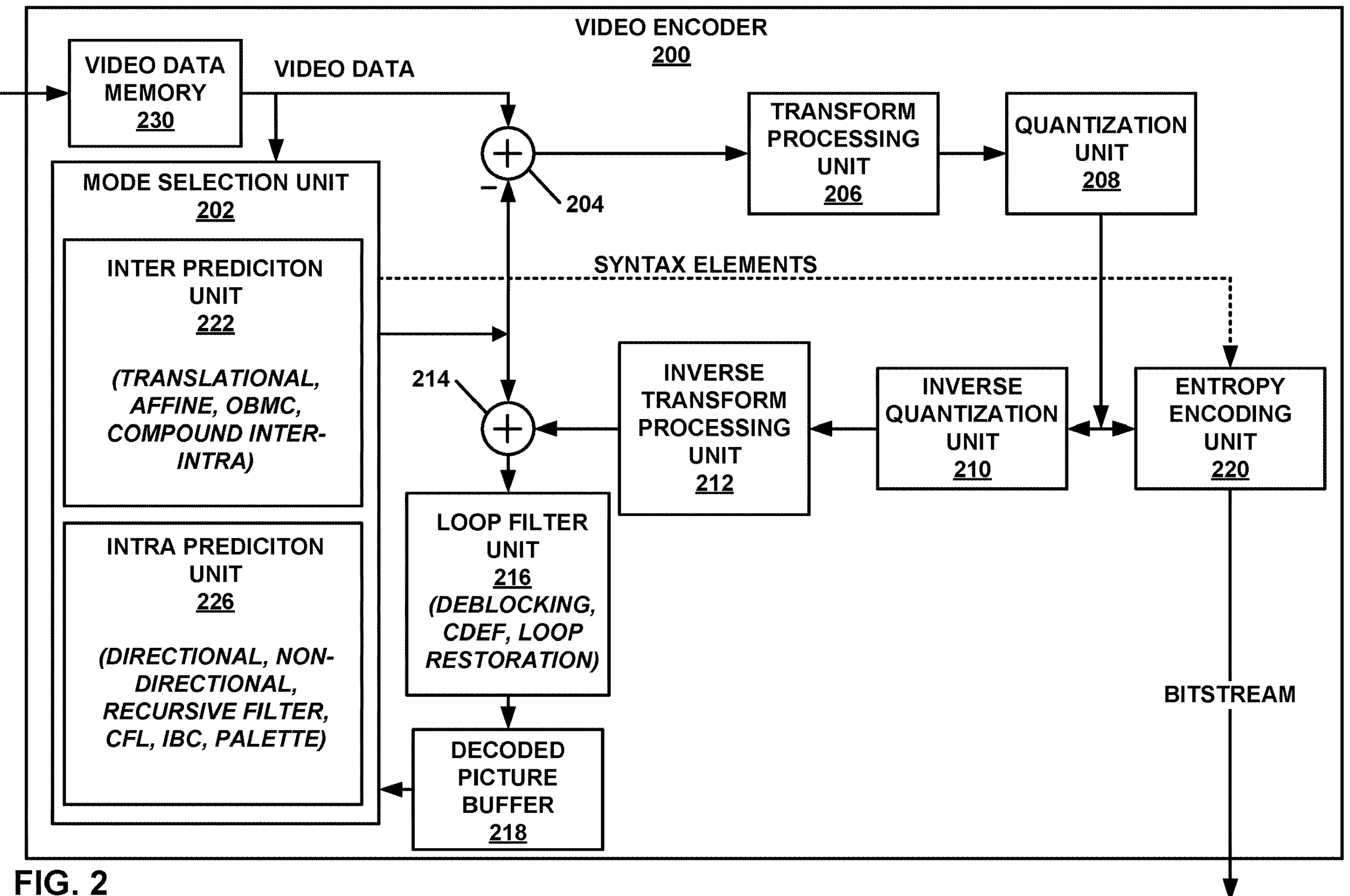
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of the AV1 coding format. However, the techniques of this disclosure may be performed by video encoding devices that are configured to encode video data according to other video coding formats and/or various video coding standards.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, loop filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, loop filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200. For example, as will be explained below, video data memory 230 may include a first buffer and a second buffer for storing the sums and averages of reconstructed luma sample values for CFL prediction.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture/frame of the video data from video data memory 230 and provide the video data to residual generation unit 204 and mode selection unit 202. Video data in video data memory 230 may be raw video data that is to be encoded.

Mode selection unit 202 includes inter prediction unit 222 and intra prediction unit 226. Inter prediction unit 222 may be configured to encode coding blocks of video data (e.g., both luma and chroma coding blocks) using translational motion compensation, affine motion compensation, OBMC, and/or compound inter-intra prediction, as described above. Intra prediction unit 226 may be configured to encode coding blocks of video data (e.g., both luma and chroma coding blocks) using directional intra prediction, non-directional intra prediction, recursive filter intra prediction, CFL, intra block copy (IBC), and/or color palette mode, as described above. Mode selection unit 202 may include additional functional units to perform video prediction in accordance with other prediction modes.

Mode selection unit 202 generally coordinates multiple encoding passes to test combinations of encoding parameters and resulting rate-distortion values for such combinations. The encoding parameters may include partitioning of superblocks into coding blocks, prediction modes for the coding blocks, transform types for residual data of the coding blocks, quantization parameters for residual data of the coding blocks, and so on. Mode selection unit 202 may ultimately select the combination of encoding parameters having rate-distortion values that are better than the other tested combinations.

Video encoder 200 may partition a picture retrieved from video data memory 230 into a series of coding blocks, and encapsulate one or more superblocks within tile. Mode selection unit 202 may partition superblocks of the picture in accordance with a tree structure.

In general, mode selection unit 202 also controls the components thereof (e.g., inter prediction unit 222 and intra prediction unit 226) to generate prediction samples for a current coding block. For example, for translational inter prediction of a current block, inter prediction unit 222 may perform a motion search to identify one or more closely matching reference blocks in one or more reference pictures (e.g., one or more previously coded pictures stored in DPB 218).

In particular, inter prediction unit 222 may calculate a value representative of how similar a potential reference block is to the current block, e.g., according to sum of absolute difference (SAD), sum of squared differences (SSD), mean absolute difference (MAD), mean squared differences (MSD), or the like. Inter prediction unit 222 may generally perform these calculations using sample-by-sample differences between the current block and the reference block being considered. Inter prediction unit 222 may identify a reference block having a lowest value resulting from these calculations, indicating a reference block that most closely matches the current block.

For translational inter prediction, inter prediction unit 222 may form one or more motion vectors (MVs) that defines the positions of the reference blocks in the reference pictures relative to the position of the current block in a current picture. For example, for uni-directional inter prediction, inter prediction unit 222 may determine a single motion vector, whereas for bi-directional inter prediction, inter prediction unit 222 may determine two motion vectors.

Inter prediction unit 222 may then generate a prediction block of prediction samples using the motion vectors. For example, inter prediction unit 222 may retrieve data of the reference block using the motion vector. As another example, if the motion vector has fractional sample precision, inter prediction unit 222 may interpolate values for the prediction block according to one or more interpolation filters. Moreover, for bi-directional inter prediction, inter prediction unit 222 may retrieve data for two reference blocks identified by respective motion vectors and combine the retrieved data, e.g., through sample-by-sample averaging or weighted averaging.

As another example, for intra prediction, intra prediction unit 226 may generate the prediction samples from samples in the same picture as the current block. In some examples, intra prediction unit 226 may generate prediction samples from reference samples that neighbor the current block. For example, for directional intra prediction modes, intra prediction unit 226 may generally mathematically combine values of neighboring samples and use these calculated values in the defined direction across the current block as the prediction block. As another example, for the non-directional DC mode, intra prediction unit 226 may calculate an average of the neighboring samples to the current block to generate the prediction samples.

For other video coding techniques such as an intra block copy mode, affine motion compensation, recursive filter intra prediction, and other prediction modes, as some examples, inter prediction unit 222 or intra prediction unit 226 generates prediction samples in accordance with the techniques of the particular coding mode being used. In some examples, such as color palette mode coding, intra prediction unit 226 may not generate prediction samples, and instead generates syntax elements that indicate the manner in which to reconstruct the block based on a selected color palette. In such modes, mode selection unit 202 may provide these syntax elements to entropy encoding unit 220 to be encoded.

Mode selection unit 202 provides the prediction samples to residual generation unit 204. Residual generation unit 204 receives a raw, unencoded version of the current block from video data memory 230 and the prediction samples from mode selection unit 202. Residual generation unit 204 calculates sample-by-sample differences between the current block and the prediction samples. The resulting sample-by-sample differences define a residual block for the current block. In some examples, residual generation unit 204 may be formed using one or more subtractor circuits that perform binary subtraction.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current coding block. Video encoder 200 (e.g., via mode selection unit 202) may adjust the degree of quantization applied to the transform coefficient blocks associated with the current block by adjusting the QP value associated with the coding block. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current coding block (albeit potentially with some degree of distortion) based on the reconstructed residual block and the prediction samples generated by mode selection unit 202. For example, reconstruction unit 214 may add samples of the reconstructed residual block to corresponding prediction samples generated by mode selection unit 202 to produce the reconstructed block.

Loop filter unit 216 may perform one or more filter operations on reconstructed blocks. For example, loop filter unit 216 may perform deblocking operations to reduce blockiness artifacts along edges of CUs. In other examples, loop filter unit 216 may apply a constrained directional enhancement filter (CDEF), which may be applied after deblocking, and may include the application of non-separable non-linear low-pass directional filters based on estimated edge directions. Loop filter unit 216 may also include a loop restoration filter, which is applied after CDEF, and may include a separable symmetric normalized Wiener filter or a dual self-guided filter. Operations of loop filter unit 216 may be skipped, in some examples.

Video encoder 200 stores reconstructed blocks in DPB 218. For instance, in examples where operations of loop filter unit 216 are not performed, reconstruction unit 214 may store reconstructed blocks to DPB 218. In examples where operations of loop filter unit 216 are performed, loop filter unit 216 may store the filtered reconstructed blocks to DPB 218. Inter prediction unit 222 may retrieve a reference picture from DPB 218, formed from the reconstructed (and potentially filtered) blocks, to inter predict blocks of subsequently encoded pictures. In addition, intra prediction unit 226 may use reconstructed blocks in DPB 218 of a current picture to intra predict other blocks in the current picture.

As discussed in further detail below, DPB 218 may include a plurality of frame buffers. For instance, DPB 218 may include a first frame buffer and a second frame buffer. The first frame buffer may operate as a so called "scratch" frame buffer, and the second frame buffer may operate as a compressed frame buffer. When predicting blocks of video data, intra prediction unit 226 and/or inter prediction unit 222 may store, in parallel, reconstructed blocks of video data of a current picture in both the first and second frame buffers. When predicting a block of the current picture using intra block copy (IBC), intra prediction unit 226 may obtain samples from a reference block in the current picture from the first frame buffer.

The first and second frame buffers may have different properties. As one example, a size of the first frame buffer may be is less than a size of the second frame buffer. For instance, the size of the first frame buffer is selected to store a single picture of video data and the size of the second frame buffer is selected to store a plurality of pictures of video data.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter prediction or intra mode information for intra prediction) from mode selection unit 202.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as 15 bit cumulative distribution functions (CDFs). Entropy encoding unit 22 may perform recursive scaling, with an update factor based on the alphabet size, to update the contexts.

Video encoder 200 may output an encoded video bitstream that includes the entropy encoded syntax elements needed to reconstruct blocks of a slice or picture. For example, entropy encoding unit 220 may output the bitstream.

Video encoder 200 represents an example of a device configured to encode video data including a memory configured to store video data, and one or more processing units implemented in circuitry and configured to reconstruct samples of a first block of a current picture of video data; store, in parallel, a compressed version of the samples of the first block of video data in a first frame buffer and an uncompressed version of the samples of the first block of video data in a second frame buffer; and responsive to determining to reconstruct a second block of the current picture of video data using intra block copy: obtain, from the second frame buffer, samples of a predictor block located in the current picture of video data, the predictor block at least partially overlapping the first block of video data; and predict, based on the obtained samples of the predictor block, samples of the second block.

Figure 3:
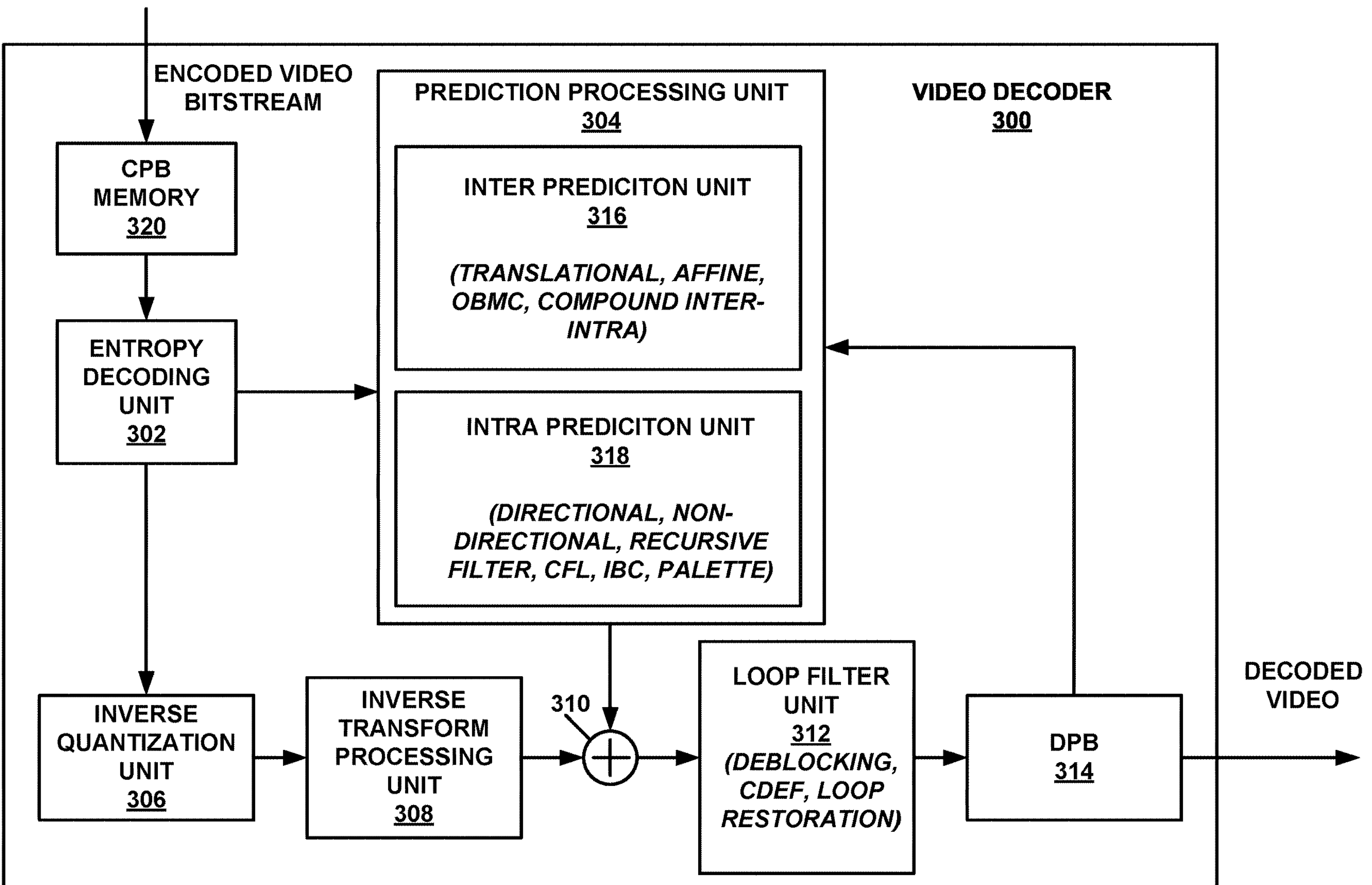
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of the AV1 video coding format. However, the techniques of this disclosure may be performed by video decoding devices that are configured to decode video data according to other video coding formats and/or various other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, loop filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, loop filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes inter prediction unit 316 and intra prediction unit 318. Inter prediction unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above. Prediction processing unit 304 may include additional functional units to perform video prediction in accordance with other prediction modes.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. For example, as will be explained below, CPB memory 320 may include a first buffer and a second buffer for storing the sums and averages of reconstructed luma sample values for CFL prediction.

DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

As discussed in further detail below, DPB 314 may include a plurality of frame buffers. For instance, DPB 314 may include a first frame buffer and a second frame buffer. The first frame buffer may operate as a so called "scratch" frame buffer, and the second frame buffer may operate as a compressed frame buffer. When predicting blocks of video data, intra prediction unit 318 and/or inter prediction unit 316 may store, in parallel, reconstructed blocks of video data of a current picture in both the first and second frame buffers. When predicting a block of the current picture using intra block copy (IBC), intra prediction unit 318 may obtain samples from a reference block in the current picture from the first frame buffer.

The first and second frame buffers may have different properties. As one example, a size of the first frame buffer may be is less than a size of the second frame buffer. For instance, the size of the first frame buffer is selected to store a single picture of video data and the size of the second frame buffer is selected to store a plurality of pictures of video data.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from CPB memory 320 and entropy decodes the video data to reproduce syntax elements. Prediction processing unit 304, inverse quantization unit 306, inverse transform processing unit 308, reconstruction unit 310, and loop filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current coding block. For example, inverse transform processing unit 308 may apply a horizontal/vertical combination of an inverse DCT, inverse ADST, inverse flipped ADST, or an inverse identity transform.

Furthermore, prediction processing unit 304 generates prediction samples according to prediction information syntax elements that were entropy decoded by entropy decoding unit 302. For example, if the prediction information syntax elements indicate that the current block is inter predicted, inter prediction unit 316 may generate the prediction samples. In this case, the prediction information syntax elements may indicate a reference picture in DPB 314 from which to retrieve a reference block, as well as a motion vector identifying a location of the reference block in the reference picture relative to the location of the current block in the current picture. Inter prediction unit 316 may generally perform the inter prediction process in a manner that is substantially similar to that described with respect to inter prediction unit 22 (FIG. 2).

As another example, if the prediction information syntax elements indicate that the current block is intra predicted, intra prediction unit 318 may generate the prediction samples according to an intra prediction mode indicated by the prediction information syntax elements. Again, intra prediction unit 318 may generally perform the intra prediction process in a manner that is substantially similar to that described with respect to intra prediction unit 226 (FIG. 2). Intra prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding prediction samples to reconstruct the current block.

Loop filter unit 312 may perform one or more filter operations on reconstructed blocks. For example, loop filter unit 312 may perform deblocking operations to reduce blockiness artifacts along edges of the reconstructed blocks. In other examples, loop filter unit 312 may apply a constrained directional enhancement filter (CDEF), which may be applied after deblocking. and may include the application of non-separable non-linear low-pass directional filters based on estimated edge directions. Loop filter unit 312 may also include a loop restoration filter, which is applied after CDEF, and may include a separable symmetric normalized Wiener filter or a dual self-guided filter. Operations of loop filter unit 312 are not necessarily performed in all examples.

Video decoder 300 may store the reconstructed blocks in DPB 314. For instance, in examples where operations of loop filter unit 312 are not performed, reconstruction unit 310 may store reconstructed blocks to DPB 314. In examples where operations of loop filter unit 312 are performed, loop filter unit 312 may store the filtered reconstructed blocks to DPB 314. As discussed above, DPB 314 may provide reference information, such as samples of a current picture for intra prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to reconstruct samples of a first block of a current picture of video data; store, in parallel, a compressed version of the samples of the first block of video data in a first frame buffer and an uncompressed version of the samples of the first block of video data in a second frame buffer; and responsive to determining to reconstruct a second block of the current picture of video data using intra block copy: obtain, from the second frame buffer, samples of a predictor block located in the current picture of video data, the predictor block at least partially overlapping the first block of video data; and predict, based on the obtained samples of the predictor block, samples of the second block.

Figure 6:
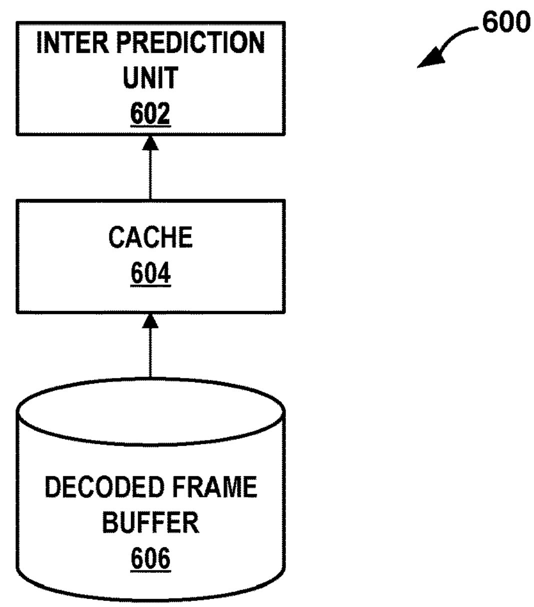
FIG. 6 is a conceptual diagram illustrating an example data flow through a video coder performing inter prediction.

FIG. 6 is a conceptual diagram illustrating an example data flow through a video coder performing inter prediction. As shown in FIG. 6, inter prediction data flow 600 includes inter prediction unit 602, cache 604, and decoded frame buffer 606. Inter prediction unit 602 may be considered to be an example of inter prediction unit 222 and/or inter prediction unit 316. Decoded frame buffer 606 may be considered an example of, and/or may be included in, DPB 218 and/or DPB 314.

In operation, to predict a block of a first picture using inter prediction (e.g., as shown in FIG. 4), inter prediction unit 602 may obtain reconstructed samples from other pictures from decoded frame buffer 606 (e.g., via cache 604). These reconstructed samples were previously stored in decoded frame buffer 606 during or after reconstruction of the other pictures.

Figure 7:
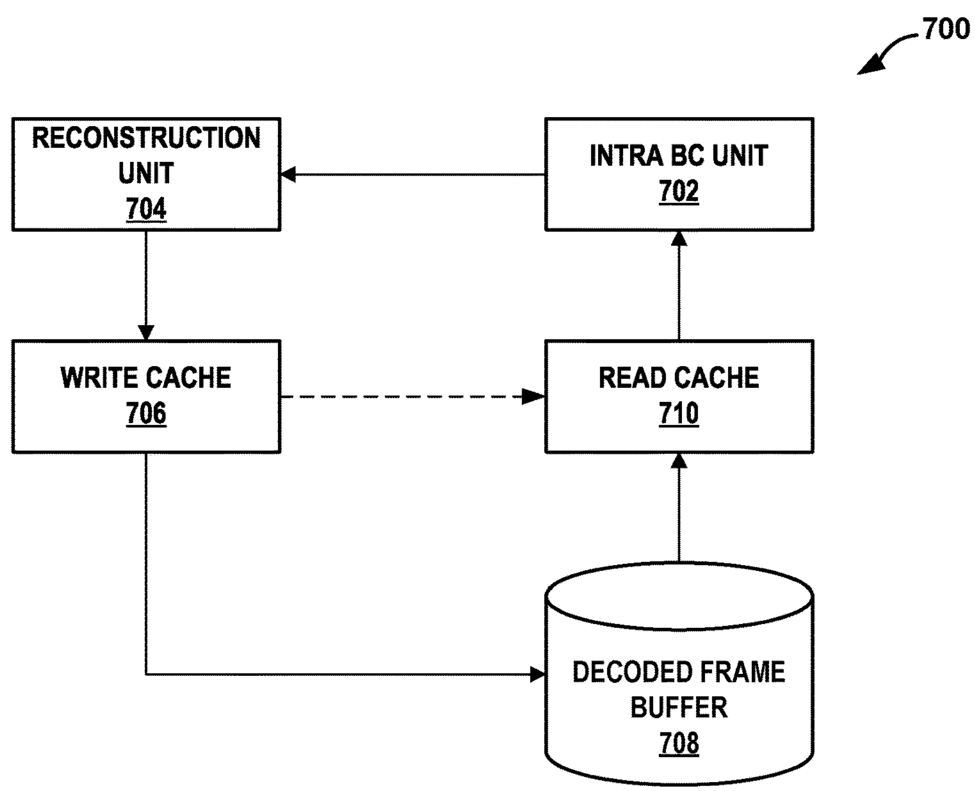
FIG. 7 is a conceptual diagram illustrating an example data flow through a video coder performing inter block copy (IBC).

FIG. 7 is a conceptual diagram illustrating an example data flow through a video coder performing inter block copy (IBC). As shown in FIG. 7, IBC data flow 700 includes IBC unit 702, reconstruction unit 704, write cache 706, decoded frame buffer 708, and read cache 710. IBC unit 702 may be considered to be an example of inter prediction unit 222 and/or inter prediction unit 316. Reconstruction unit 704 may be considered an example of reconstruction unit 214 and/or reconstruction unit 310. Decoded frame buffer 708 may be considered an example of, and/or may be included in, DPB 218 and/or DPB 314. Reconstruction unit 704 may store reconstructed samples of a current picture in decoded frame buffer 708 (e.g., via write cache 706).

In operation, to predict a block of the current picture using IBC (e.g., as shown in FIG. 5), IBC unit 702 may obtain reconstructed samples from the current picture from decoded frame buffer 708 (e.g., via read cache 710). As such, to perform IBC, IBC unit 702 may predict blocks in the current picture from already decoded areas of the current picture.

Figure 8:
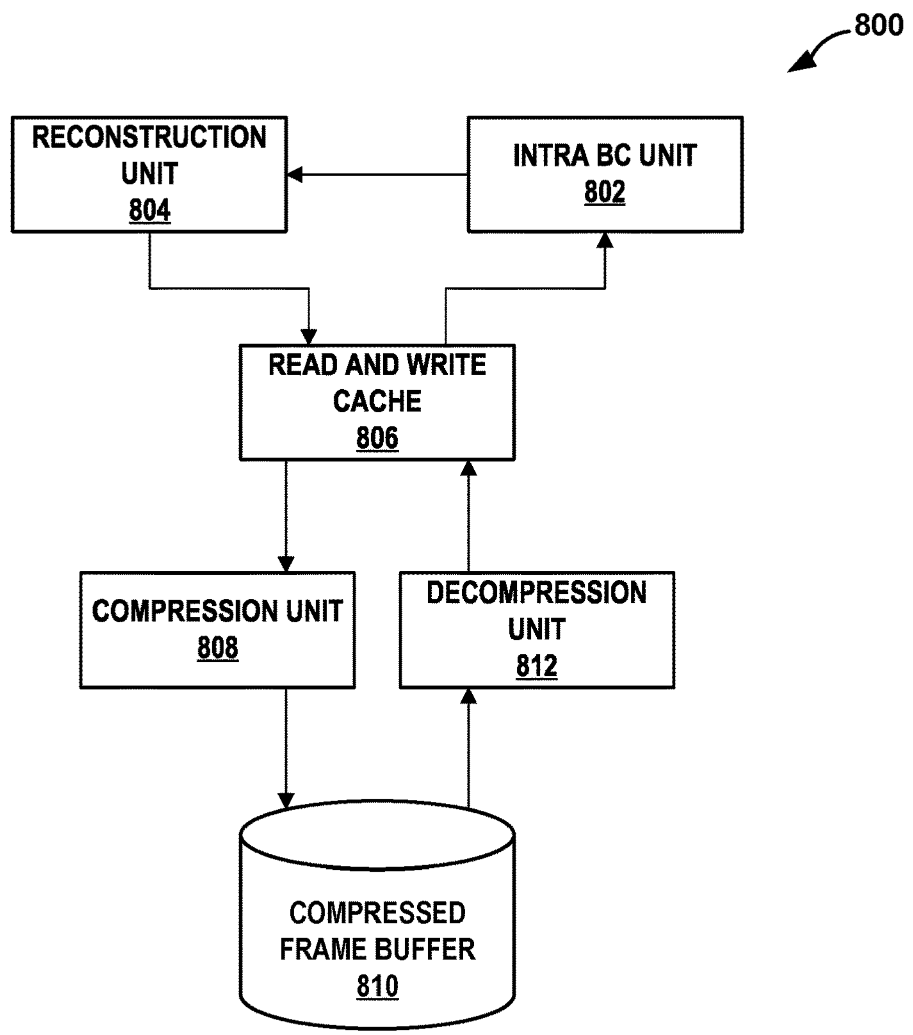
FIG. 8 is a conceptual diagram illustrating another example data flow through a video coder performing IBC.

FIG. 8 is a conceptual diagram illustrating another example data flow through a video coder performing inter block copy (IBC). As shown in FIG. 8, IBC data flow 800 includes IBC unit 802, reconstruction unit 804, read and write cache 806, compression unit 808, compressed frame buffer 810, and decompression unit 812. IBC unit 802 may be considered to be an example of inter prediction unit 222 and/or inter prediction unit 316. Reconstruction unit 804 may be considered an example of reconstruction unit 214 and/or reconstruction unit 310. Compressed frame buffer 810 may be considered an example of, and/or may be included in, DPB 218 and/or DPB 314.

If a picture is decoded by multiple sample processing engines, the current picture samples may be output from multiple engines in any order. In some examples, to address complications that the random ordering may produce, IBC data flow 800 may include combined read and write cache 806. Read and write cache 806 may perform operations to trace which samples are written and which samples are read. Such tracing may require production and/or storage of control data.

In some examples, it may be desirable to reduce the size of stored frames in frame buffers. As such, in some examples, IBC data flow 800 may include compression unit 808 and decompression unit 812. Compression unit 808 may be configured to compress samples of video data before they are stored/written to compressed frame buffer 810. Compression unit 808 may utilize any suitable compression technique. Decompression unit 812 may perform a decompression technique that is reciprocal to the compression technique performed by compression unit 808.

Utilizing compression may introduce various complications. As one example, tracing the samples may become more difficult and/or may require additional control data. As another example, as compressing and decompressing are performed on blocks of samples (8×4, 4×8, 8×8 samples etc.), compression unit 808 and/or decompression unit 812 may store samples at a particular time that are needed by another component at the particular time. This may cause undesirable deadlock.

Figure 9:
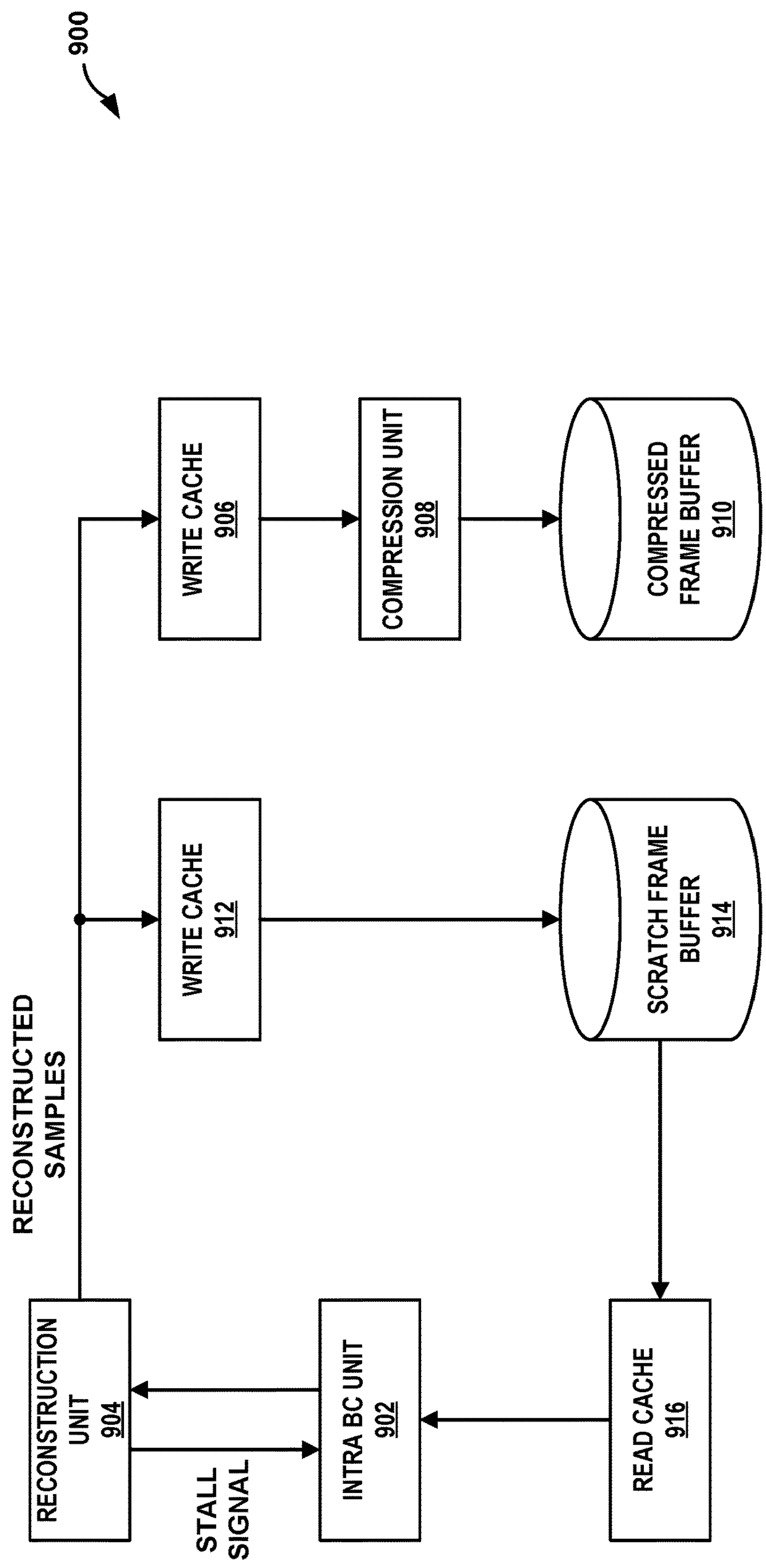
FIG. 9 is a conceptual diagram illustrating an example data flow through a video coder performing IBC.

FIG. 9 is a conceptual diagram illustrating an example data flow through a video coder performing inter block copy (IBC) with a scratch frame buffer, in accordance with one or more techniques of this disclosure. As shown in FIG. 9, IBC data flow 900 includes IBC unit 902, reconstruction unit 904, write cache 906, compression unit 908, compressed frame buffer 910, write cache 912, scratch frame buffer 914, and read cache 916. IBC unit 902 may be considered to be an example of inter prediction unit 222 and/or inter prediction unit 316. Reconstruction unit 904 may be considered an example of reconstruction unit 214 and/or reconstruction unit 310. Compressed frame buffer 910 and scratch frame buffer 914 may be included in DPB 218 and/or DPB 314. Compression unit 908 may be considered an example of compression unit 808.

As discussed above and in accordance with one or more techniques of this disclosure, a video coder may utilize a scratch frame buffer in addition to a compressed frame buffer when performing intra block copy. After reconstructing samples of a block of a current picture, reconstruction unit 904 may store the reconstructed samples of the current block to both scratch frame buffer 914 and compressed frame buffer 910. For instance, reconstruction unit 904 may output the reconstructed samples of the current block to both write cache 906 and 912. Write cache 906 may cause compression unit 908 to generate a compressed version of the reconstructed samples and write the compressed version of the reconstructed samples to compressed frame buffer 910. Write cache 912 may write an uncompressed version of the reconstructed samples to scratch frame buffer 914.

Scratch frame buffer 914 may accumulate reconstructed samples of the current picture and, in some examples, may be initialized (e.g., cleared), when the current picture is fully reconstructed. In contrast, compressed frame buffer 910 may store samples used in the reconstruction of multiple pictures. As such, a size of scratch frame buffer 914 may considerably smaller than compressed frame buffer 910, even though scratch frame buffer 914 stores uncompressed samples and compressed frame buffer 910 stores compressed samples. In some examples, a size of scratch frame buffer 914 may be selected to be just large enough to store a single picture of video data. In contrast, a size of compressed frame buffer 910 may selected to be large enough to store a plurality of pictures of video data (e.g., 4, 8, 16, 32 pictures). As such, the size of scratch frame buffer 914 may be smaller than the size of compressed frame buffer 910. As the samples stored in scratch frame buffer 914 are not compressed, scratch frame buffer 914 may complete writing an uncompressed version of samples of a block before compressed frame buffer 910 completes writing a compressed version of the samples the block.

In some examples, scratch frame buffer 914 and compressed frame buffer 910 may be separate physical devices. In some examples, scratch frame buffer 914 and compressed frame buffer 910 may included in a same physical device (e.g., but be separately allocated portions, either physical or logical, within the physical device).

When performing intra block copy (IBC or intra BC), IBC unit 902 may obtain reference samples from scratch frame buffer 914 (e.g., as opposed to obtaining the reference samples from compressed frame buffer 910). As such, IBC unit 902 may perform IBC prediction without the reference samples having to pass through a decompression unit. Similarly, IBC unit 902 may perform IBC prediction without having to use a combined read and write cache. In this way, IBC data flow 900 may avoid the need to perform pixel/sample tracing, which may desirably reduce complexity.

Components of IBC data flow 900 may perform one or more operations to avoid deadlock. For example, reconstruction unit 904 may notify IBC unit 902 when the data is completely written to scratch frame buffer 914. If data has not yet written out (e.g., if scratch frame buffer 914 has not completed writing the uncompressed version of the reconstructed samples), reconstruction unit 904 may stall IBC unit 902 so that IBC unit 902 can wait until the data is ready in scratch frame buffer 914. As such, IBC unit 902 may refrain from obtaining samples of a predictor block until after scratch frame buffer 914 completes writing an uncompressed version of the samples.

Figure 10:
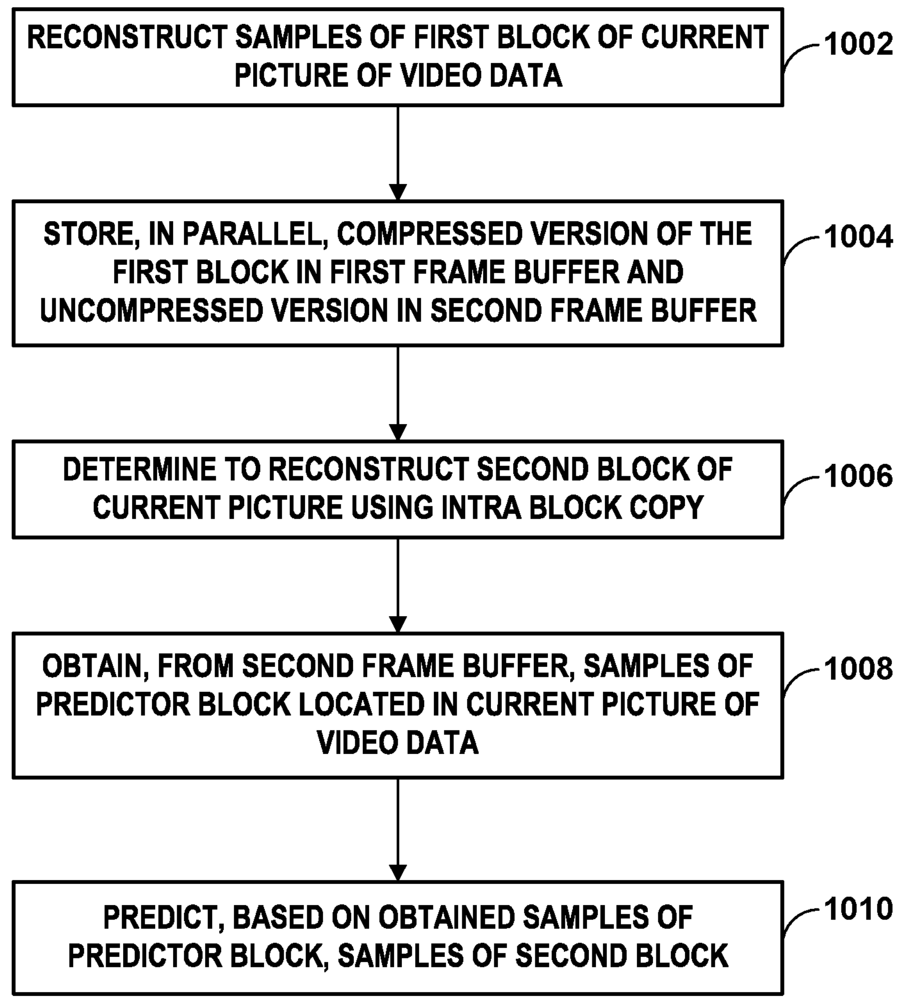
FIG. 10 is a flowchart illustrating an example method for coding a current block in accordance with the techniques of this disclosure.

FIG. 10 is a flowchart illustrating an example method for coding a current block in accordance with the techniques of this disclosure. Although described with respect to a video coder that includes IBC data flow 900 (FIG. 9), it should be understood that other devices and/or components may be configured to perform a method similar to that of FIG. 10.

A video coder (e.g., video encoder 200 and/or video decoder 300) may reconstruct samples of a first block of a current picture of video data (1002). For instance, reconstruction unit 904 may add a predicted samples of the first block to residual data of the first block to reconstruct the samples of the first block.

The video coder may store, in parallel, a compressed version of the samples of the first block of video data in a first frame buffer and an uncompressed version of the samples of the first block of video data in a second frame buffer (1004). For instance, write cache 906 may cause compression unit 908 to generate a compressed version of the reconstructed samples of the first block and store the compressed version in compressed frame buffer 910. Additionally, write cache 912 may cause scratch frame buffer 914 to store an uncompressed version of the reconstructed samples of the first block.

The video coder may determine to reconstruct a second block of the current picture using intra block copy (1006). For instance, a mode selection unit (e.g., mode selection unit 202 of FIG. 2) may determine to reconstruct the second block using intra block copy. Alternatively or additionally, a syntax element in a bitstream may indicate that the second block is coded using intra block copy.

To reconstruct the second block using intra block copy, the video coder may obtain, from the second frame buffer, samples of a predictor block located in the current picture of video data (1008) and predict, based on the obtained samples of the predictor block, samples of the second block (1010). For instance, IBC unit 902 may cause read cache 916 to read the samples of the predictor block from scratch frame buffer 914. The predictor block may be identified by a vector (e.g., a block vector or motion vector) that represents a displacement between the second block and the predictor block. In some examples, the predictor block may at least partially overlap the first block of video data. The first block may or may not be adjacent to the second block. For instance, the second block may not immediately follow the first block in coding order. As discussed above, by obtaining the samples of the predictor block from a scratch frame buffer such as the second frame buffer, the video coder may avoid having to perform sample tracing and may otherwise improve intra BC performance.

The following clauses may illustrate one or more aspects of the disclosure:

Clause 1. An apparatus configured to code video data, the apparatus comprising: a first frame buffer configured to store video data; a second frame buffer configured to store video data; and one or more processors implemented in circuitry and in communication with the memory, the one or more processors configured to: reconstruct samples of a first block of a current picture of video data; store, in parallel, a compressed version of the samples of the first block of video data in the first frame buffer and an uncompressed version of the samples of the first block of video data in the second frame buffer; and responsive to determining to reconstruct a second block of the current picture of video data using intra block copy: obtain, from the second frame buffer, samples of a predictor block located in the current picture of video data, the predictor block at least partially overlapping the first block of video data; and predict, based on the obtained samples of the predictor block, samples of the second block.

Clause 2. The apparatus of clause 1, wherein a size of the first frame buffer is less than a size of the second frame buffer.

Clause 3. The apparatus of clause 2, wherein the size of the first frame buffer is selected to store a single picture of video data and the size of the second frame buffer is selected to store a plurality of pictures of video data.

Clause 4. The apparatus of any of clauses 1-3, wherein, to store the compressed version of the samples in the first frame buffer and the uncompressed version of the samples in the second frame buffer, the one or more processors are configured to: cause the first frame buffer to write the compressed version of the samples; and cause the second frame buffer to write the uncompressed version of the samples.

Clause 5. The apparatus of clause 4, wherein the second frame buffer completes writing the uncompressed version of the samples before the first frame buffer completes writing the compressed version of the samples.

Clause 6. The apparatus of clause 5, wherein the one or more processors are configured to: refrain from obtaining the samples of the predictor block until after the second frame buffer completes writing the uncompressed version of the samples.

Clause 7. The apparatus of any of clauses 1-6, wherein the apparatus is configured to decode video data.

Clause 8. The apparatus of any of clauses 1-7, further comprising a display configured to display decoded video data obtained via the first frame buffer.

Clause 9. The apparatus of any of clauses 1-8, further comprising a camera configured to capture a picture of video data.

Clause 10. The apparatus of any of clauses 1-9, wherein the apparatus comprises one or more of a camera, a computer, a mobile device, a broadcast receiver device, or a set-top box.

Clause 11. A method for coding video data, the method comprising: reconstructing samples of a first block of a current picture of video data; storing, in parallel, a compressed version of the samples of the first block of video data in a first frame buffer and an uncompressed version of the samples of the first block of video data in a second frame buffer; and responsive to determining to reconstruct a second block of the current picture of video data using intra block copy: obtaining, from the second frame buffer, samples of a predictor block located in the current picture of video data, the predictor block at least partially overlapping the first block of video data; and predicting, based on the obtained samples of the predictor block, samples of the second block.

Clause 12. The method of clause 11, wherein a size of the first frame buffer is less than a size of the second frame buffer.

Clause 13. The method of clause 12, wherein the size of the first frame buffer is selected to store a single picture of video data and the size of the second frame buffer is selected to store a plurality of pictures of video data.

Clause 14. The method of any of clauses 11-13, wherein storing the compressed version of the samples in the first frame buffer and the uncompressed version of the samples in the second frame buffer comprises: causing the first frame buffer to write the compressed version of the samples; and causing the second frame buffer to write the uncompressed version of the samples.

Clause 15. The method of clause 14, wherein the second frame buffer completes writing the uncompressed version of the samples before the first frame buffer completes writing the compressed version of the samples.

Clause 16. The method of clause 15, further comprising: refraining from obtaining the samples of the predictor block until after the second frame buffer completes writing the uncompressed version of the samples.

Clause 17. A computer readable storage medium storing instruction that, when executed, cause one or more processors to: reconstruct samples of a first block of a current picture of video data; store, in parallel, a compressed version of the samples of the first block of video data in a first frame buffer and an uncompressed version of the samples of the first block of video data in a second frame buffer; and responsive to determining to reconstruct a second block of the current picture of video data using intra block copy: obtain, from the second frame buffer, samples of a predictor block located in the current picture of video data, the predictor block at least partially overlapping the first block of video data; and predict, based on the obtained samples of the predictor block, samples of the second block.

Clause 18. The computer readable storage medium of clause 17, wherein the instructions that cause the one or more processors to store the compressed version of the samples in the first frame buffer and the uncompressed version of the samples in the second frame buffer comprise instructions that cause the one or more processors to: cause the first frame buffer to write the compressed version of the samples; and cause the second frame buffer to write the uncompressed version of the samples.

Clause 19. The computer readable storage medium of clause 18, wherein the second frame buffer completes writing the uncompressed version of the samples before the first frame buffer completes writing the compressed version of the samples.

Clause 20. The computer readable storage medium of clause 19, further comprising instructions that cause the one or more processors to: refrain from obtaining the samples of the predictor block until after the second frame buffer completes writing the uncompressed version of the samples.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus, the apparatus comprising:
a first frame buffer configured to store first video data;
a second frame buffer configured to store second video data; and
one or more processors implemented in circuitry, the one or more processors configured to:
reconstruct samples of a first block of a current picture of video data;
store both a compressed version of the reconstructed samples of the first block in the first frame buffer and an uncompressed version of the reconstructed samples of the first block in the second frame buffer such that, at a particular time, the first frame buffer stores the compressed version of the reconstructed samples and the second frame buffer stores the uncompressed version of the reconstructed samples; and
responsive to a determination to reconstruct a second block of the current picture using intra block copy:
obtain, from the second frame buffer, samples of a predictor block located in the current picture, the predictor block at least partially overlapping the first block; and
predict, based on the obtained samples of the predictor block, samples of the second block.

2. The apparatus of claim 1, wherein a size of the second frame buffer is less than a size of the first frame buffer.

3. The apparatus of claim 2, wherein the size of the second frame buffer is selected to store a single picture and the size of the first frame buffer is selected to store a plurality of pictures.

4. The apparatus of claim 1, wherein, to store the compressed version of the reconstructed samples in the first frame buffer and the uncompressed version of the reconstructed samples in the second frame buffer, the one or more processors are configured to:
cause the first frame buffer to write the compressed version of the reconstructed samples; and
cause the second frame buffer to write the uncompressed version of the reconstructed samples.

5. The apparatus of claim 4, wherein the second frame buffer completes writing the uncompressed version of the reconstructed samples before the first frame buffer completes writing the compressed version of the reconstructed samples.

6. The apparatus of claim 5, wherein the one or more processors are configured to:
not obtain the samples of the predictor block until after the second frame buffer completes writing the uncompressed version of the reconstructed samples.

7. The apparatus of claim 1, wherein the apparatus is configured to decode the video data.

8. The apparatus of claim 1, further comprising a display configured to display decoded video data obtained via the first frame buffer.

9. The apparatus of claim 1, further comprising a camera configured to capture a picture associated with the video data.

10. The apparatus of claim 1, wherein the apparatus comprises one or more of a camera, a computer, a mobile device, a broadcast receiver device, or a set-top box.

11. The apparatus of claim 1, wherein the first frame buffer and the second frame buffer are separate physical devices.

12. The apparatus of claim 1, wherein the one or more processors are configured to:
in response to the current picture being fully reconstructed, clear the second frame buffer.

13. A method, the method comprising:
reconstructing samples of a first block of a current picture of video data;
storing both a compressed version of the reconstructed samples of the first block in a first frame buffer and an uncompressed version of the reconstructed samples of the first block in a second frame buffer such that, at a particular time, the first frame buffer stores the compressed version of the reconstructed samples and the second frame buffer stores the uncompressed version of the reconstructed samples; and responsive to determining to reconstruct a second block of the current picture using intra block copy:

obtaining, from the second frame buffer, samples of a predictor block located in the current picture, the predictor block at least partially overlapping the first block; and predicting, based on the obtained samples of the predictor block, samples of the second block.

14. The method of claim 13, wherein a size of the second frame buffer is less than a size of the first frame buffer.

15. The method of claim 14, wherein the size of the second frame buffer is selected to store a single picture and the size of the first frame buffer is selected to store a plurality of pictures.

16. The method of claim 13, wherein storing the compressed version of the reconstructed samples in the first frame buffer and the uncompressed version of the reconstructed samples in the second frame buffer comprises:

causing the first frame buffer to write the compressed version of the reconstructed samples; and causing the second frame buffer to write the uncompressed version of the reconstructed samples.

17. The method of claim 16, wherein the second frame buffer completes writing the uncompressed version of the reconstructed samples before the first frame buffer completes writing the compressed version of the reconstructed samples.

18. The method of claim 17, further comprising:

not obtaining the samples of the predictor block until after the second frame buffer completes writing the uncompressed version of the reconstructed samples.

19. A computer readable storage medium storing instruction that, when executed, cause one or more processors to:

reconstruct samples of a first block of a current picture of video data;

store both a compressed version of the reconstructed samples of the first block in a first frame buffer and an uncompressed version of the reconstructed samples of the first block in a second frame buffer such that, at a particular time, the first frame buffer stores the compressed version of the reconstructed samples and the second frame buffer stores the uncompressed version of the reconstructed samples; and responsive to a determination to reconstruct a second block of the current picture using intra block copy:

obtain, from the second frame buffer, samples of a predictor block located in the current picture, the predictor block at least partially overlapping the first block; and predict, based on the obtained samples of the predictor block, samples of the second block.

20. The computer readable storage medium of claim 19, wherein the instructions that cause the one or more processors to store the compressed version of the reconstructed samples in the first frame buffer and the uncompressed version of the reconstructed samples in the second frame buffer comprise instructions that cause the one or more processors to:

cause the first frame buffer to write the compressed version of the reconstructed samples; and cause the second frame buffer to write the uncompressed version of the reconstructed samples.

21. The computer readable storage medium of claim 20, wherein the second frame buffer completes writing the uncompressed version of the reconstructed samples before the first frame buffer completes writing the compressed version of the reconstructed samples.

22. The computer readable storage medium of claim 21, further comprising instructions that cause the one or more processors to:

not obtain the samples of the predictor block until after the second frame buffer completes writing the uncompressed version of the reconstructed samples.

* * * * *